(12) United States Patent
Kumar

(10) Patent No.: US 9,191,332 B2
(45) Date of Patent: Nov. 17, 2015

(54) METHODS, SYSTEMS, AND COMPUTER READABLE MEDIA FOR UPDATING SEQUENCE AND ACKNOWLEDGMENT NUMBERS ASSOCIATED WITH REPLAY PACKETS

(75) Inventor: Pradeep Kumar, Bethian (IN)

(73) Assignee: IXIA, Calabasas, CA (US)

( * ) Notice: Subject to any disclaimer, the term of this patent is extended or adjusted under 35 U.S.C. 154(b) by 606 days.

(21) Appl. No.: 13/538,576

(22) Filed: Jun. 29, 2012

(65) Prior Publication Data

US 2014/0003438 A1    Jan. 2, 2014

(51) Int. Cl.
*H04L 12/801* (2013.01)
*H04L 1/16* (2006.01)
*H04L 1/18* (2006.01)

(52) U.S. Cl.
CPC .............. *H04L 47/34* (2013.01); *H04L 1/1628* (2013.01); *H04L 1/1642* (2013.01); *H04L 1/1671* (2013.01); *H04L 1/1809* (2013.01)

(58) Field of Classification Search
None
See application file for complete search history.

(56) References Cited

U.S. PATENT DOCUMENTS 5,978,894 A * 11/1999 Sukegawa et al. ............ 711/203

OTHER PUBLICATIONS

Stretch, "Understanding TCP Sequence and Acknowledgment Numbers," http://www.packetlife.net/blog/2010/jun/7/understanding-tcp-sequence-acknowledgment-numbers/, pp. 1-1-6 (Jun. 7, 2010).

\* cited by examiner

*Primary Examiner* — Timothy J Weidner
(74) *Attorney, Agent, or Firm* — Jenkins, Wilson, Taylor & Hunt, P.A.

(57) ABSTRACT

Methods, systems, and computer readable media for updating sequence and acknowledgment numbers associated with replay packets are disclosed. In one example, a method includes generating, at a sending peer node, a replay packet that includes a payload associated with a capture file packet and accessing, in the sending peer node, a sequence-differential (SEQ-DIFF) list using an original sequence number associated with the replay packet. The method further includes traversing entries in the SEQ-DIFF list, wherein each of the entries includes a sequence number and a payload length differential value, applying, for each traversed entry in the SEQ-DIFF list, the payload length differential value to the original sequence number to determine an updated sequence number for the replay packet, and transmitting, from the sending peer node to a receiving peer node, the replay packet that includes the updated sequence number.

24 Claims, 8 Drawing Sheets

METHODS, SYSTEMS, AND COMPUTER READABLE MEDIA FOR UPDATING SEQUENCE AND ACKNOWLEDGMENT NUMBERS ASSOCIATED WITH REPLAY PACKETS

TECHNICAL FIELD

The subject matter described herein relates to the replay of capture files in a test environment. More specifically, the subject matter relates to methods, systems, and computer readable media for updating sequence and acknowledgment numbers associated with replay packets.

BACKGROUND

Transmission control protocol (TCP) utilizes a sequence number in a packet to identify the order and number of payload bytes communicated from one computer node to another so that data can be properly reconstructed, regardless of any fragmentation or packet loss that may occur during transmission. Notably, the sequence number is incremented to respectively represent each payload byte that has been previously transmitted by a sending node.

Replaying a capture file (e.g., a plurality of previously captured network packets that may be replayed to simulate a real world traffic environment/scenario) having TCP packets over Internet protocol (IP) (i.e. replay of an IP payload) does not require any special handling for TCP sequence or acknowledgment numbers unless the exact payload is to be replayed from a different originating host. Specifically, problems can arise when the payload is modified during replay to simulate a real world scenario. One exemplary scenario occurs when a sending peer node prepares to replay an HTTP capture file and the original host name (e.g., www.google.com) of a GET command needs to be modified to the IP address (e.g., 10.0.0.1) of the new host (i.e., the receiving host peer node) being used to replay the capture file. For example, suppose the host name of www.google.com, which may represented by a length of 14 bytes, is to be replaced with an IP address 10.0.0.1, which may have a length of 8 bytes during runtime. Thus, a differential (e.g., difference in payload length) of −6 bytes is introduced in the sequence number (or acknowledgment number) for all subsequent packets. Due to this sequence numbering discrepancy that is not accounted for by the transmitted/received packets, a receiving peer node or device under test (DUT) will not accept any subsequent packets thereby causing the replay to fail.

Similarly, additional discrepancies may be encountered when a DUT sequence number randomization feature is enabled in a DUT. With this feature activated, the DUT modifies the sequence number of any received SYN packet and maintains an internal sequencing/numbering value based on the modified value. Thus, if a sending or receiving peer node fails to account for this difference, the DUT will drop all received packets and the replay will fail.

Accordingly, a need exists for improved methods, systems, and computer readable media for updating sequence and acknowledgment numbers associated with replay packets.

SUMMARY

Methods, systems, and computer readable media for updating sequence and acknowledgment numbers associated with replay packets are disclosed. According to one embodiment, the method includes generating, at a sending peer node, a replay packet that includes a payload associated with a capture file packet and accessing, in the sending peer node, a sequence-differential (SEQ-DIFF) list using an original sequence number associated with the replay packet. The method further includes traversing entries in the SEQ-DIFF list, wherein each of the entries includes a sequence number and a payload length differential value, applying, for each traversed entry in the SEQ-DIFF list, the payload length differential value to the original sequence number to determine an updated sequence number for the replay packet, and transmitting, from the sending peer node to a receiving peer node, the replay packet that includes the updated sequence number.

The subject matter described herein may be implemented in software in combination with hardware and/or firmware. For example, the subject matter described herein may be implemented in software executed by a processor (e.g., a hardware-based processor). In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, such as field programmable gate arrays, and application specific integrated circuits. In addition, a computer readable medium that implements the subject matter described herein may be located on a single device or computing platform or may be distributed across multiple devices or computing platforms.

As used herein, the term "node" refers to a physical computing platform, such as a server or computer device, that includes one or more processors and memory. As used herein, the terms "function" or "module" refer to software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable media for updating sequence and acknowledgment numbers associated with replay packets. Reference will now be made in detail to exemplary embodiments of the present subject matter, examples of which are illustrated in the accompanying drawings. Wherever possible, the same reference numbers will be used throughout the drawings to refer to the same or like parts.

The present subject matter involves the modification of sequence (SEQ) numbers and acknowledgment (ACK) numbers in replay packets associated with a capture file at run time to accommodate device under test (DUT) sequence number randomization behavior and payload length changes. Based on this information, a new sequence number and a new acknowledgment number are calculated for each replay packet being transmitted from a peer node. As used herein, the replay packet includes a packet payload identical to the packet payload of an original capture file.

Figure 1:
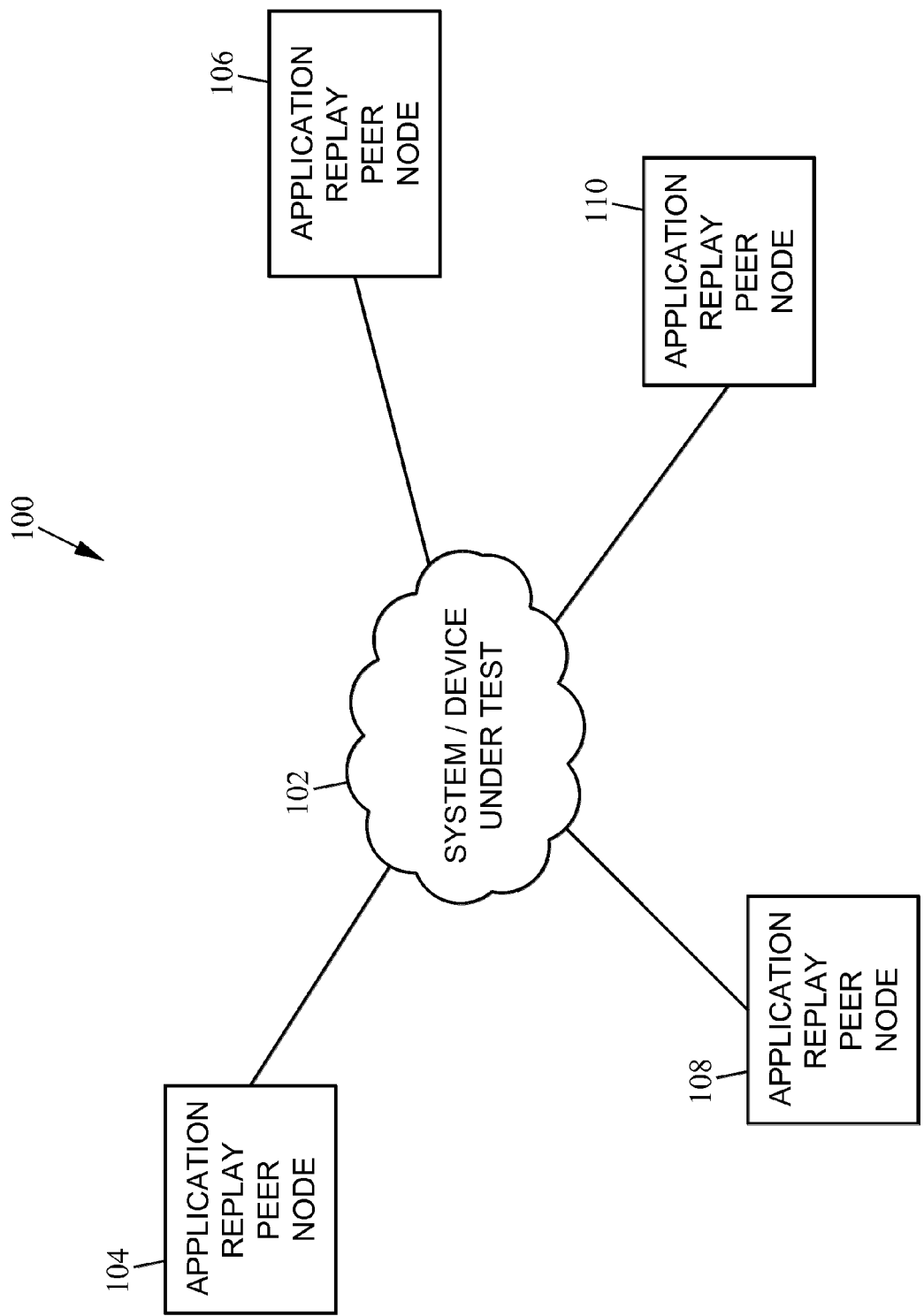
FIG. 1 is a block diagram illustrating an exemplary network that facilitates the updating of sequence and acknowledgment numbers associated with replay packets according to an embodiment of the subject matter described herein.

FIG. 1 is a block diagram illustrating an exemplary testing environment network 100. Testing network 100 may include a system under test or device under test (DUT) 102 that is communicatively connected to a plurality of application replay peer nodes 104-110. Although only one DUT and four application replay peer nodes are depicted in FIG. 1, additional peer nodes, DUTs, and network elements may be included in network 100 without departing from the scope of the present subject matter. Peer nodes 104-110 may be configured to communicate TCP packets to each other via DUT 102.

Figure 2:
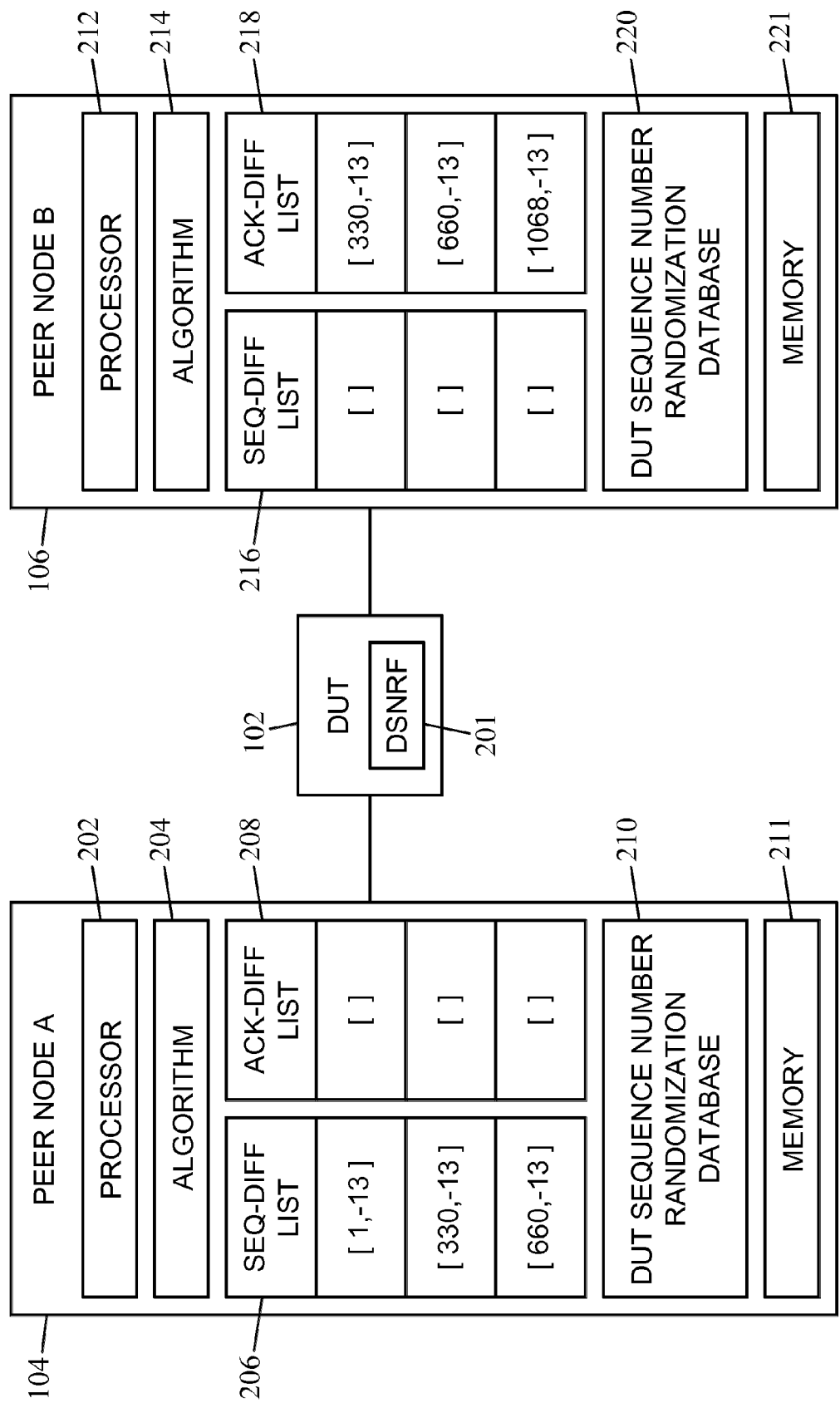
FIG. 2 is a block diagram illustrating peer nodes configured to communicate replay packets with updated sequence numbers and acknowledgment numbers according to an embodiment of the subject matter described herein.

FIG. 2 is a block diagram that depicts components included in exemplary application replay peer nodes 104-106 and DUT 102. In one embodiment, application peer node 104 is a peer node that includes a hardware based processor unit 202, an algorithm module 204 (which may be executed by processor unit 202), a sequence-differential list 206, an acknowledgment-differential list 208, a DUT sequence number randomization database 210, and memory 211. In one embodiment, processor 202 may include a hardware based processing unit configured to execute software based programs or instructions, such as algorithm 204. Algorithm 204 may include a non-transitory computer readable medium or software program that is configured to manage and update sequence and acknowledgment numbers associated with replay packets. Processor 202 and algorithm 204 may also be configured to utilize data stored in memory 211, such as capture file information. In one embodiment, capture file information may include meta-data associated with a capture file that is to be replayed during a test scenario. The provisioning and storing of capture file information is discussed below.

For each active connection established between two peer nodes (e.g., peer node A 104 and peer node B 106), the following set of information is maintained at a given peer node: 1) a "differential due to DUT sequence number randomization" value, 2) a sequence differential list with entries of original sequence numbers and respective changes in payload length (e.g., lists 206 and 216), and 3) an acknowledgment differential list with entries of calculated acknowledgment numbers and respective changes in payload length (e.g., lists 208 and 218). The differential due to DUT sequence number randomization value may be stored in database 210.

In one embodiment, sequence differential (SEQ-DIFF) list 206 may include any memory or database unit that is configured to store one or more entries, wherein each entry includes an original sequence number and a payload length differential value (e.g., [sequence number, payload length differential value]). Notably, the payload length differential value represents the difference between the payload length of an original capture file packet and the payload length of an associated replay packet. For example, the payload length may be modified in the replay packet to accommodate a change in the originating host address. Likewise, acknowledgment-differential (ACK-DIFF) list 208 may include any memory or database unit that is configured to store one or more entries, wherein each entry includes an acknowledgment number and a packet payload length differential value (e.g., [acknowledgment number, payload length differential value]).

Application peer node B 106 may similarly include a hardware based processor unit 212, an algorithm module 214 (which may be executed by processor unit 212), a SEQ-DIFF list 216, an ACK-DIFF list 218, and a DUT sequence number randomization database 220. In one embodiment, the components of peer node B 106 are identical to and configured to perform the same tasks as the above-mentioned components of peer node A 104.

Each time a packet is to be transmitted from one peer node to another peer node, the sending peer node accesses and traverses through entries in a SEQ-DIFF list 206 to calculate a current packet sequence number. For example, the entries of SEQ-DIFF list 206 are traversed in an ascending manner until an entry containing a sequence number greater than or equal to (e.g., with respect to numerical value) the current packet's original sequence number is located. Specifically, SEQ-DIFF list 206 may be traversed (i.e., on an entry by entry basis) so long as the original sequence number is greater than the sequence number in the list entry currently being compared/traversed. In one embodiment, a process of calculating a new sequence number involves algorithm 204 checking whether the current packet's original sequence number is greater than the sequence number value (e.g., a sequence number value "5") in the current list entry being traversed. In the event the packet's original sequence number is greater than the current entry's sequence number (e.g., value "5"), the sending peer node may apply a differential value (e.g., a differential value "D" that is included in the entry) to the original sequence number to obtain a current sequence number. For example, when a replay packet is to be sent from a sending peer node 104, sending peer node 104 may access SEQ-DIFF list 206 and traverse the entries of SEQ-DIFF list 206 using the original sequence number of the current packet to be sent. If the original sequence number of the current packet to be sent is greater than the sequence number of the first entry in SEQ-DIFF list 206, then algorithm 204 applies the associated payload length differential value/number to the original sequence number to calculate an "updated" or "current" sequence number. In one embodiment, the payload length differential value/number represents the size difference (e.g., difference in the number of bytes) between the payload length of the replay packet and the payload length of the capture file packet. Similarly, for each subsequent entry in SEQ-DIFF list 206 that is traversed, the current sequence number (which is the modified original sequence number) of the packet is updated with that entry's stored differential change in payload length (see example in FIG. 4). Thus, while traversing the SEQ-DIFF list, the current sequence number of the replay packet continues to be updated with the differential of each traversed entry (i.e., each traversed entry is an entry in which the original sequence number of the replay packet exceeds the sequence number of the traversed entry in the SEQ-DIFF list). Once SEQ-DIFF list 206 is traversed, a new sequence number for replay packet is determined (i.e., updated sequence number). This new sequence number is included in the replay packet to be transmitted to the receiving peer node. The new updated sequence number in the replay packet enables a receiving peer node and/or DUT to accept the packet without error. In one embodiment, the replay packet is communicated between the peer nodes via an Internet protocol (IP) socket.

Similarly, ACK-DIFF list 208 may also be accessed and traversed until an acknowledgment number greater than the original acknowledgment number of the current packet is found in the list. For each entry of ACK-DIFF list 208 that is traversed, the current acknowledgment number is updated with the entry's stored differential change in payload length (see example in FIG. 4). Notably, the ACK-DIFF list is traversed in the same manner as the SEQ-DIFF list described above.

In addition to maintaining the SEQ-DIFF list and ACK-DIFF list, a peer node may also update the acknowledgment numbers of a replay packet prior to transmission with a "differential due to DUT sequence number randomization" value/number to account for a DUT sequence number randomization feature supported at a DUT. To accommodate for the DUT sequence number randomization feature, the sending peer node A 104 may access database 210 to obtain a stored differential value introduced by the DUT. Sending peer node A 104 may then be configured to utilize the stored value to update the acknowledgment numbers of the current packet to be sent.

In one embodiment, a peer node (e.g., peer node A 104) may utilize an algorithm (e.g., algorithm 204) to determine that a DUT is utilizing a DUT sequence number randomization feature. For each SYN/SYN-ACK replay packet that is received, peer node A 104 may first determine if there is any differential due to DUT sequence number randomization or not. If yes, then the differential number will be stored locally as a "differential due to DUT sequence number randomization" value. If such a value is stored at sending peer 104 in database 210, then the "differential due to DUT sequence number randomization" value is added to the acknowledgment number of the current sending packet to calculate the adjusted acknowledgment number.

Similarly, peer node B 106 may receive a SYN/SYN-ACK replay packet and may determine (e.g., utilizing an algorithm 214) if there is a differential applied by DUT 102. For example, a received SYN replay packet having a sequence number "X" may include a differential introduced by DUT value of "Z" (e.g., such that X=Y+Z, where Y is the original sequence number for the current SYN packet and Z is the differential value introduced by the DUT). Thus, for each packet sent by this peer node, the value Z is applied to the acknowledgment number to produce an updated/adjusted acknowledgment number. In one embodiment, the value Z is determined by using capture file information. For example, each peer is provisioned with capture file information that includes each packet's original payload and payload length. Using this information, each peer node is able to determine the original sequence and original acknowledgement number. Similarly, a receiving peer node may utilize this information with its algorithm to detect whether a differential value has been introduced by a DUT. For example, the receiving peer node may determine whether the payload has been modified or not by checking the payload length of the packet that was actually received with the packet payload information included in the capture file information.

If the modification of the payload of the current packet that is being sent results in a change in payload length, then an entry to the SEQ-DIFF list is added. The entry may include the original sequence number of the replay packet and the change in payload length. The differential/change in payload length may be represented as either a positive or negative number that indicates the difference between the payload length (in bytes) of the original capture file packet and the payload length of the replay packet. In one embodiment, the entry is added to the SEQ-DIFF list in ascending sorted order.

For example, for each replay packet that is modified by the sending peer node in a manner that causes the payload length of the replay packet to change, the original sequence number and associated differential value of the replay packet is stored as an entry in the SEQ-DIFF list. If the payload length of the replay packet is modified by a differential value "D" and has an original sequence number "S", then the entry (S, D) may be added to the SEQ-DIFF list (in ascending order by sequence number).

In one embodiment, the receiving peer node may utilize an algorithm (e.g., algorithm 214) to determine whether the replay packet has been modified by a sending peer node. During an application replay, each peer node has been previously provisioned with capture file information that includes knowledge/data of original capture file properties, such as payload data, payload length, and replay directional data (e.g., source to destination or destination to source).

In one embodiment, the capture file information may be distributed to the peer nodes prior to a test scenario by a dedicated machine or node (not shown) in system 100. For example, the dedicated node may host a function or component (e.g., a Windows function or component) that is configured to provide the capture file information as well as test related instructions and information to all peer nodes involved in a test. For example, if a traffic test is to be run for ten minutes then the dedicated node is configured to initiate the test as well as notifying the peer nodes to stop generating packet traffic after ten minutes. It may also communicate with all of the peer nodes to obtain statistics and to configure the peer nodes throughout the test duration. Once received by the peer nodes, the capture file information may be stored in memory (e.g., memory 211 or 221) or a database. The capture information may then be utilized by a peer node to generate packet traffic for a test. Notably, the capture file information provides a peer node with data that can be used to determine whether a given packet in a capture file replay is to be sent or received by the peer node (see example below).

With this capture file information, each peer is able to determine the original sequence number, the original acknowledgment number, and any other information required at run-time. Thus, a receiving peer node may use the known capture file information to detect whether or not a sending peer node is sending data per the capture file. A receiving peer node may determine whether a payload has been modified by inspecting the payload length of the received packet. Notably, the receiving peer node then compares the received payload length value with the payload length data in the capture file information.

In one exemplary scenario, sending peer node A 104 and peer node B 106 may conduct an application replay process that involves a replay of a capture file having six (6) packets with the following capture file information:
Packet 1: TCP Payload Length=40, TCP Payload="payload A" (Hex Value), Direction=SRC_TO_DST
Packet 2: TCP Payload Length=50, TCP Payload="payload B" (Hex Value), Direction=DST_TO_SRC
Packet 3: TCP Payload Length=60, TCP Payload="payload C" (Hex Value), Direction=DST_TO_SRC
Packet 4: TCP Payload Length=70, TCP Payload="payload D" (Hex Value), Direction=SRC_TO_DST Packet 5: TCP Payload Length=80, TCP Payload="payload E" (Hex Value), Direction=DST_TO_SRC
Packet 6: TCP Payload Length=90, TCP Payload="payload F" (Hex Value), Direction=SRC_TO_DST A file containing the capture file information may be stored in memory (e.g., memory 211 and/or memory 221) or a database. The capture file information is role-specific so the capture file information will be different depending on whether it is stored at peer node A 104 and peer node B 106. Notably, the source to destination (SRC_TO_DST) information and destination to source (SRC_TO_DST) information in the shared capture file information will vary based on the specific peer node. For example, the capture file information for peer node A 104 may include:

Packet 1: TCP Payload Length=40, TCP Payload="payload A" (Hex Value), Direction=SRC_TO_DST
Packet 2: TCP Payload Length=50, TCP Payload="payload B" (Hex Value), Direction=DST_TO_SRC
Packet 3: TCP Payload Length=60, TCP Payload="payload C" (Hex Value), Direction=DST_TO_SRC
Packet 4: TCP Payload Length=70, TCP Payload="payload D" (Hex Value), Direction=SRC_TO_DST
Packet 5: TCP Payload Length=80, TCP Payload="payload E" (Hex Value), Direction=DST_TO_SRC
Packet 6: TCP Payload Length=90, TCP Payload="payload F" (Hex Value), Direction=SRC_TO_DST Similarly, the capture file information for peer node B 106 may include:

Packet 1: TCP Payload Length=40, TCP Payload="payload A" (Hex Value), Direction=DST_TO_SRC
Packet 2: TCP Payload Length=50, TCP Payload="payload B" (Hex Value), Direction=SRC_TO_DST
Packet 3: TCP Payload Length=60, TCP Payload="payload C" (Hex Value), Direction=SRC_TO_DST
Packet 4: TCP Payload Length=70, TCP Payload="payload D" (Hex Value), Direction=DST_TO_SRC
Packet 5: TCP Payload Length=80, TCP Payload="payload E" (Hex Value), Direction=SRC_TO_DST
Packet 6: TCP Payload Length=90, TCP Payload="payload F" (Hex Value), Direction=DST_TO_SRC During the replay, each peer node checks the current packet in the capture file information. If the current packet's direction (i.e., replay directional data) is from source to destination (i.e., SRC_TO_DST), then the peer node is the source node (for that particular packet) and is configured to send the associated packet to the other peer node. Similarly, if the current packet instruction indicates a destination to source (i.e., DST_to_SRC) direction, then the peer node is the destination node (for that particular packet) and is configured to wait for the packet from the other peer node. In one embodiment, the receiving peer node (i.e., the destination peer) may inspect the received packet to attempt to determine a match by packet length. In this scenario, the receiving peer node checks whether the current packet being received has the same packet payload length as the TCP payload length indicated in the capture file information.

Thus, during the replay procedure, each peer node checks its stored capture file information (e.g., in memory or in a database) for the current packet to be transmitted and determines whether it is the source peer or destination peer. In the above example, peer node A 104 determines that the first packet in its capture file information has a direction of SRC_TO_DST. Thus, peer node A 104 determines that it is the source peer node and is responsible for sending the first packet. Once peer node B 106 receives the packet, peer node B 106 may conduct a check to determine whether the received packet is the same packet for which peer node B 106 was waiting for. For example, peer node B 106 may compare the payload length of the received packet with the payload length value that is indicated in the capture file information. If all the checks are successful, packet 1 will be accepted by peer node B 106.

After sending the first packet, peer node A 104 may check the capture file information to determine what action is to be taken for the second packet. As shown above, the capture file information indicates that peer node A 104 is designated as the destination peer node since the packet direction of packet 2 is DST_TO_SRC for peer node A 104. Similarly, peer node B 106 also checks its capture file information and determines that peer node B is the source peer node and is responsible for sending packet 2. Thus, peer node B 106 sends the second packet with content "payload B" to peer node A 104. Similar payload length and sequence number checks may be performed by peer node A 104 before accepting the packet.

Figure 3:
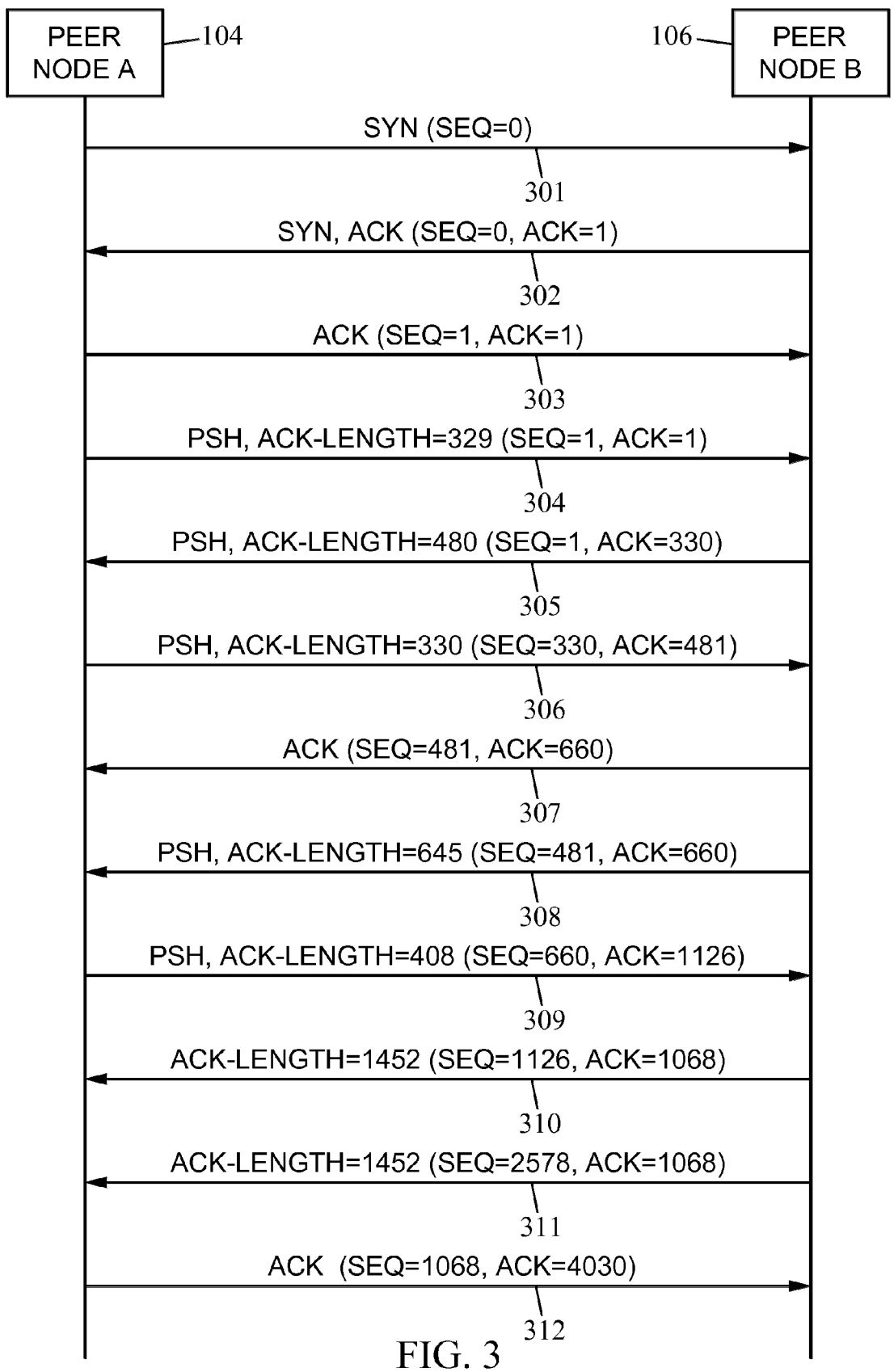
FIG. 3 is a signaling flow diagram illustrating an exemplary use of transmitting packets without updating sequence and acknowledgment numbers in accordance with the subject matter described herein.

FIG. 3 is a diagram illustrating an exemplary signaling sequence associated with communicating peer nodes without updating sequence and acknowledgment numbers. In this example, peer node A 104 is requesting original content from peer node B 106 (i.e., there is no replaying of a capture file).

In FIG. 3, each side of the TCP session starts out with a relative sequence number of zero. In one embodiment, peer node A 104 initiates a handshaking procedure by directing a synchronize (SYN) message 301 to initiate a connection with peer node B 106. SYN message 301 is depicted as having a sequence (SEQ) number equal to zero (e.g., a relative sequence number) and an acknowledgment (ACK) number equal to zero. In response to receiving SYN packet 301, peer node B 106 responds to peer node A 104 with a SYN/ACK packet 302 which functions as an acknowledgment to SYN packet 301 as well as its own SYN message. Notably, SYN/ACK packet 302 includes a SEQ number equal to zero and an ACK number equal set to a value of one (e.g., to indicate the receipt of the SYN flag contained in message 301). To complete the handshaking procedure, peer node A 104 sends an ACK packet 303 to peer node B 106 to acknowledge receipt of the SYN portion of packet 302. ACK packet 303 includes a SEQ number equal to 1 and an ACK number equal to 1. Client server 104 includes a sequence number of 1 since the SYN packet from peer node B 106 increases its own sequence number from zero to 1.

Upon completing the handshaking procedure, the sequence number for both peer node A 104 and peer node B 106 is equal to 1. Notably, the initial increment of 1 on the sequence number of both peer node A 104 and peer node B 106 occurs on the establishment of a TCP session.

Packet 304 from peer node A 104 includes a push (PSH)/ACK packet that may comprise an HTTP GET command with a payload length of 329 bytes. Both the sequence number and acknowledgment number are equal to 1 since no data has been transmitted since the last packet in this stream and no additional data has been received from peer node B 106. Packet 305 is a PSH/ACK packet that is sent by peer node B 106 to acknowledge the data sent in packet 304 by peer node A 104. The ACK number indicated in packet 305 has been increased by 329 to 330 (i.e., 1+329=330). Push packet 305 is also used to provide the data requested by HTTP GET packet 304, which is represented by the payload length of 480 bytes.

Packet 306 is also a PSH/ACK packet that may comprise another HTTP GET command with a payload length of 330 bytes. The sequence number is equal to 330 since 330 bytes of data have been previously transmitted (but not including the present packet 306 payload of 330 bytes) to peer node B 106 from the peer node A 104. Similarly, the acknowledgment number is equal to 481 since a total of 481 bytes (i.e., 1+480=481) have been received from peer node B 106 by peer node A 104. In response to receiving packet 306, peer node B 106 issues an ACK packet 307 with a SEQ number set to 481 and an ACK number equal to 660 (which is derived from the previous acknowledgment of 330 plus the payload length of 330 in received packet 306). Peer node B 106 also issues a PSH/ACK packet 308 (with SEQ number equal to 481 and an acknowledgment number equal to 660) containing a payload length of 645 bytes to peer node A 104.

Peer node A 104 then sends a PSH/ACK packet 309 that may comprise another HTTP GET command with a payload length of 408 bytes. The sequence number is equal to 660 since 660 bytes of data have been previously transmitted (not including the present payload of 408 bytes) to peer node B 106 from the peer node A 104. Similarly, the acknowledgment number of packet 309 is equal to 1126 since 1126 bytes have been received from peer node B 106 by peer node A 104. Peer node B 106 responds with an ACK packet 310 (with a sequence number set to 1126 and an acknowledgment number equal to 1068) that has a payload length of 1452 and another ACK packet 311 with a sequence number set to 2578 and an acknowledgment number equal to 1068) that similarly has a payload length of 1452. Notably, the sequence number of packet 311 has been increased from 1126 to 2578 to account for the payload length of packet 310. In response, peer node A 104 sends an ACK packet 312 with a sequence number set to 1068 and an acknowledgment number equal to 4030. While peer node A 104 and peer node B 106 may continue communicating with each other, FIG. 3 only depicts packets 301-312 as an example.

Figure 4:
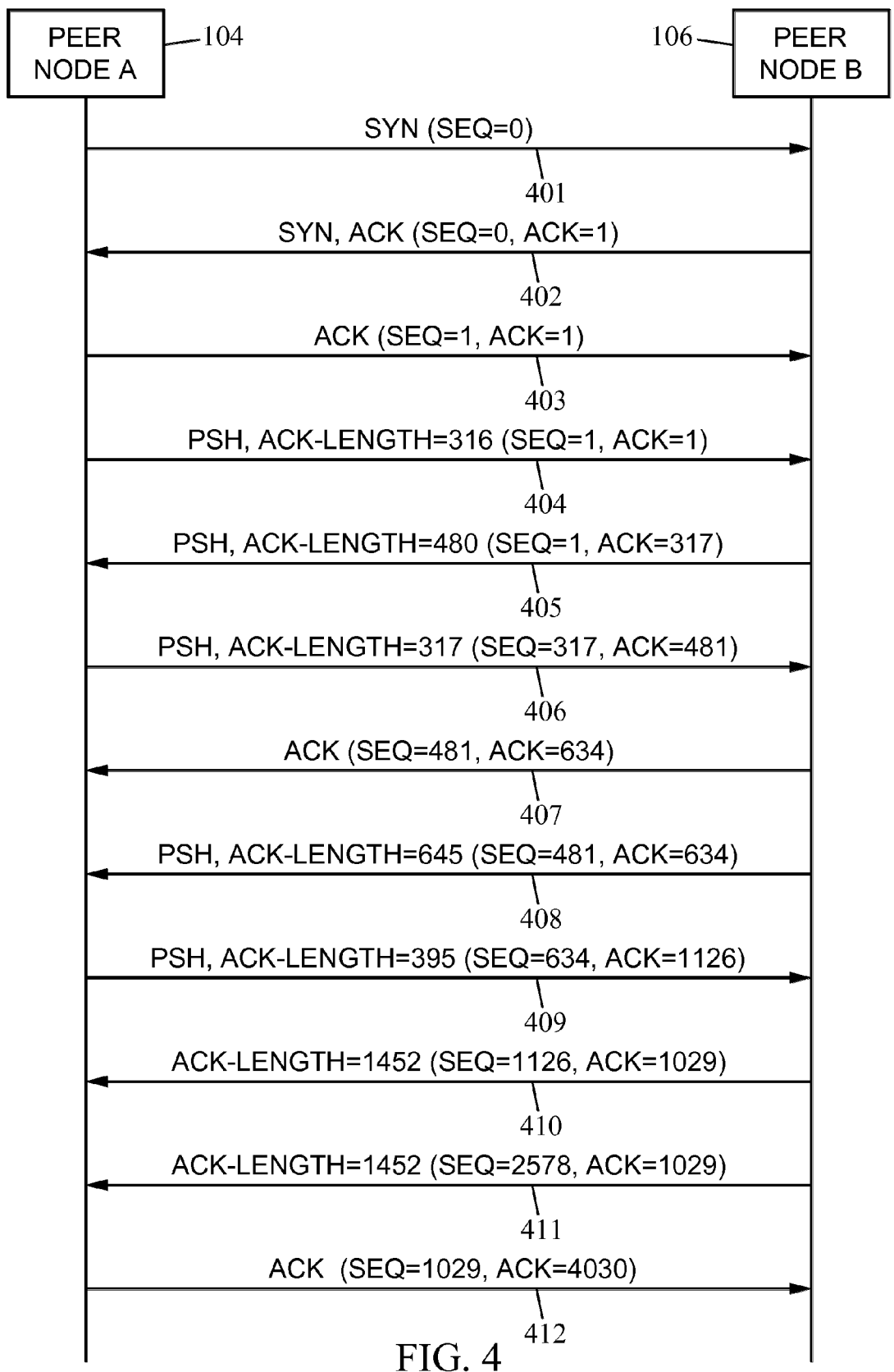
FIG. 4 is a signaling flow diagram illustrating the use of a sequence-differential list and an acknowledgment-differential list to update sequence and acknowledgment numbers according to an embodiment of the subject matter described herein.

FIG. 4 is a diagram illustrating an exemplary signaling sequence associated with communicating peer nodes utilizing sequence-differential lists and acknowledgment-differential lists according to an embodiment of the subject matter described herein. In this example, peer node A 104 is replaying a capture file and is not issuing an original request to peer node B 106. Notably, packets 401-403 are identical to packets 301-303 depicted in FIG. 3 since the handshaking procedure between peer node A 104 and peer node B 106 is conducted in the same manner as described above with respect to FIG. 3. Thus, upon completing the handshaking procedure, the sequence number and acknowledgement number for both peer node A 104 and peer node B 106 are equal to 1.

Packet 404 includes a push (PSH)/ACK packet that may comprise an HTTP GET command. However, in this embodiment, peer node A 104 is transmitting a replay of a capture file and has modified the host field in the encapsulated TCP frame. For example, peer node A 104 may have changed the original host URL name of www.ixiacom.com of the GET command to the IP address (e.g., 10.0.0.1) associated with peer node A 104, which is now the new originating host of the capture file replay. As a result of modifying the host field to accommodate this change in origination address, suppose the payload length of packet 404 is reduced by 13 bytes. If this difference in packet payload length is not accounted for, then the replay of the capture file from peer node A 104 to peer node B 106 will be rejected by peer node B 106 (and/or DUT 102). In one embodiment, processor 202 in client 104 executes algorithm 204 which accesses SEQ-DIFF list 206. At this time, there are no entries in SEQ-DIFF list 206 so an entry that includes the original sequence number (i.e., SEQ=1) and change in payload length (i.e., −13 bytes) is added to SEQ-DIFF list 206. In one embodiment, the new entry may be represented as [1, −13] as shown in list 206 in FIG. 2.

In response to receiving packet 404, peer node B 106 utilizes algorithm 214 (as executed by processor 212) to make an entry in ACK-DIFF list 218. In one embodiment, an entry that includes i) the original sequence number plus the original TCP payload length and ii) the current change in payload length, is added to ACK-DIFF list 218. Thus, an entry that includes the original sequence number plus the original TCP payload length of packet 404 (e.g., 1+329=330) and the difference in payload length of −13. In one embodiment, the new entry to ACK-DIFF list 218 may be represented as [330, −13] as shown in FIG. 2.

Peer node B 106 then sends packet 405 to acknowledge the data sent in packet 404 by peer node A 104. Notably, the ACK number indicated in packet 405 is 317. The ACK number in the replay packet 405 was supposed to include an ACK number of 330, however, algorithm 214 (as executed by processor 212) on peer node B 106 accessed ACK-DIFF list 218. Since the original acknowledgment number (i.e., 330) of the current packet (i.e., packet 405) is greater than or equal to the acknowledgment number (i.e., 330) in the ACK-DIFF list entry, the current acknowledgment number is updated with the stored change in payload length indicated in the entry (i.e., −13 bytes).

Packet 406 includes a push (PSH)/ACK packet that may comprise another HTTP GET command. Similar to packet 404, peer node A 104 is transmitting a replay of a capture file and has modified the host field in the encapsulated TCP frame (e.g., change of the original host URL name of www.ixiacom.com of the GET command to the IP address associated with peer node A 104, which is hosting the replay). By modifying the host field to accommodate this change in address, the payload length of packet 406 is reduced by 13 bytes (e.g., similar to packet 404). However, prior to adding an entry to SEQ-DIFF list 206 to reflect this modification, the entries of SEQ-DIFF list 206 are traversed (e.g., comparing the original sequence number of the current packet with the sequence numbers in the entries of list 206) to determine if any previous payload length changes need to be applied to the current sequence number.

At this time, SEQ-DIFF list 206 includes the previous entry that was made upon sending packet 404. The entry to SEQ-DIFF list 206 includes the original sequence number (i.e., SEQ=1) and change in payload length (i.e., −13 bytes). Since the original sequence number (330) of the current packet 406 is greater than the entry's sequence number (1), then the associated differential of −13 in the entry is applied to the current packet's sequence number to derive a current sequence number of 317.

After the current sequence number is calculated for packet 406, then a new entry is added to SEQ-DIFF list 206 to account for the payload length change being made to accommodate the host name modification. Like before, the entry will include the original sequence number and the change in payload length. Thus, the new entry (i.e., the second entry shown in FIG. 2) may be represented as [330, −13].

In response to receiving packet 406, peer node B 106 detects a change in payload length and utilizes algorithm 214 (as executed by processor 212) to make an entry in ACK-DIFF list 218. In one embodiment, an entry that includes i) the original sequence number plus the original TCP payload length and ii) the current change in payload length, is added to ACK-DIFF list 218. Thus, an entry that includes the original sequence number (i.e., 330) plus the original TCP payload length (i.e., 330) of packet 406 (e.g., 330+330=660) and the difference in payload length of −13 may be represented as a new entry [660, −13] to ACK-DIFF list 218 as shown in FIG. 2.

Peer node B 106 then sends ACK packet 407 to acknowledge the data received in packet 406. Notably, the (updated)

ACK number indicated in packet 407 is 634. The ACK number value of 634 was derived as follows. First, the ACK number in the previously received replay packet 406 was supposed to include an ACK number of 660 (which is known by peer node B 106 via pre-provisioned capture file information). However, algorithm 214 on peer node B 106 used the original ACK number and accessed/traversed the entries of ACK-DIFF list 218 to determine a current acknowledgment number. Specifically, the original acknowledgement number of 660 in packet 407 was determined to be greater than or equal to the acknowledgment numbers (i.e., 330 and 660) in the accessed entries in ACK-DIFF list 218. Thus, the original acknowledgment number of packet 407 is updated with the stored payload length changes indicated in each of the two list entries (i.e., 660−26=634 bytes). Peer node B 106 also issues a PSH/ACK packet 408 (with SEQ number equal to 481 and an acknowledgment number equal to 634) with a payload length of 645 bytes to peer node A 104. In this case, peer node B 106 simply uses the previously determined sequence and acknowledgment numbers used for packet 407.

Peer node A 104 then sends a PSH/ACK packet 409 that may comprise another HTTP GET command with a payload length of 395 bytes. Similar to packets 404 and 406, peer node A 104 is transmitting a replay of a capture file and has modified the host field in the encapsulated TCP frame (e.g., change of the original host URL name of www.ixiacom.com of the GET command to the IP address associated with peer node A 104, which is hosting the replay). By modifying the host field to accommodate this change in address, the payload length of packet 409 is reduced by 13 bytes (e.g., similar to packets 404 and 406). However, prior to adding an entry to SEQ-DIFF list 206 to reflect this modification, the entries of SEQ-DIFF list 206 are traversed to determine if any previous payload length changes need to be applied to the current sequence number.

At this time, SEQ-DIFF list 206 includes the previous entries that were made upon sending packets 404 and 406. The entries to SEQ-DIFF list 206 include [1, −13] and [330, −13]. Since the original sequence number (660) of the current packet 409 is greater than the entries' sequence numbers (1 and 330), then the total differential value of −26 (i.e., the total of −13 and −13) from the two entries is applied to the current packet's sequence number to derive a current (i.e., updated) sequence number of 634.

After the current sequence number is calculated for packet 409, then a new entry is added to SEQ-DIFF list 206 to account for the payload length change being made to accommodate the host name modification. Like before, the entry will include the original sequence number and the change in payload length. Thus, the new entry (i.e., the third entry shown in FIG. 2) may be represented as [660, −13].

In response to receiving packet 409, peer node B 106 detects a change in payload length and utilizes algorithm 214 (as executed by processor 212) to make an entry in ACK-DIFF list 218. In one embodiment, an entry that includes i) the original sequence number plus the original TCP payload length and ii) the current change in payload length, is added to ACK-DIFF list 218. Thus, an entry that includes the original sequence number (i.e., 660) plus the original TCP payload length (i.e., 408) of packet 409 (e.g., 660+408=1068) and the difference in payload length of −13. In one embodiment, the new entry to ACK-DIFF list 218 may be represented as [1068 −13] as shown in FIG. 2.

Peer node B 106 then sends ACK packet 410 to acknowledge the data received in packet 409. Notably, the (updated) ACK number indicated in packet 407 is 1029. The ACK number value of 1029 was derived as follows. First, the ACK number in the previously received replay packet 409 was supposed to include an ACK number of 1068, however, algorithm 214 (as executed by processor 212) on peer node B 106 accessed ACK-DIFF list 218 to determine a current acknowledgment number. Specifically, the original acknowledgement number of 1068 (as is known by peer node B 106 via the pre-provisioned capture file information) in packet 409 is determined to be is greater than or equal to the acknowledgment numbers (i.e., 330, 660, and 1068) in the accessed entries in ACK-DIFF list 218. Thus, the current acknowledgment number is updated with the stored changes in payload length indicated in each of the three list entries (i.e., −39 total bytes).

Peer node B 106 then sends packet 410 to acknowledge the data sent in packet 409. Notably, the ACK number indicated in packet 410 is 1029. The ACK number in the replay packet 409 was supposed to include an ACK number of 1068, however, algorithm 214 (as executed by processor 212) on peer node B 106 accessed ACK-DIFF list 218. Since the original acknowledgment number (i.e., 1068) of the current packet (i.e., packet 409) is greater than or equal to the acknowledgment numbers (i.e., 330, 660, 1068) in the ACK-DIFF list entry, the current acknowledgment number is updated with the stored change in payload length indicated in the entry (i.e., −39 total bytes).

Peer node B 106 also issues a PSH/ACK packet 411 (with SEQ number equal to 2578 and an acknowledgment number equal to 1029) with a payload length of 1452 bytes to peer node A 104. Notably, the sequence number of packet 411 has been increased from 1126 to 2578 to account for the payload length of packet 410. In response, peer node A 104 sends an ACK packet 412 with a sequence number set to 1029 and an acknowledgment number equal to 4030. While peer node A 104 and peer node B 106 may continue communicating with each other, FIG. 4 only depicts packets 401-412 as an example.

Figure 5A:
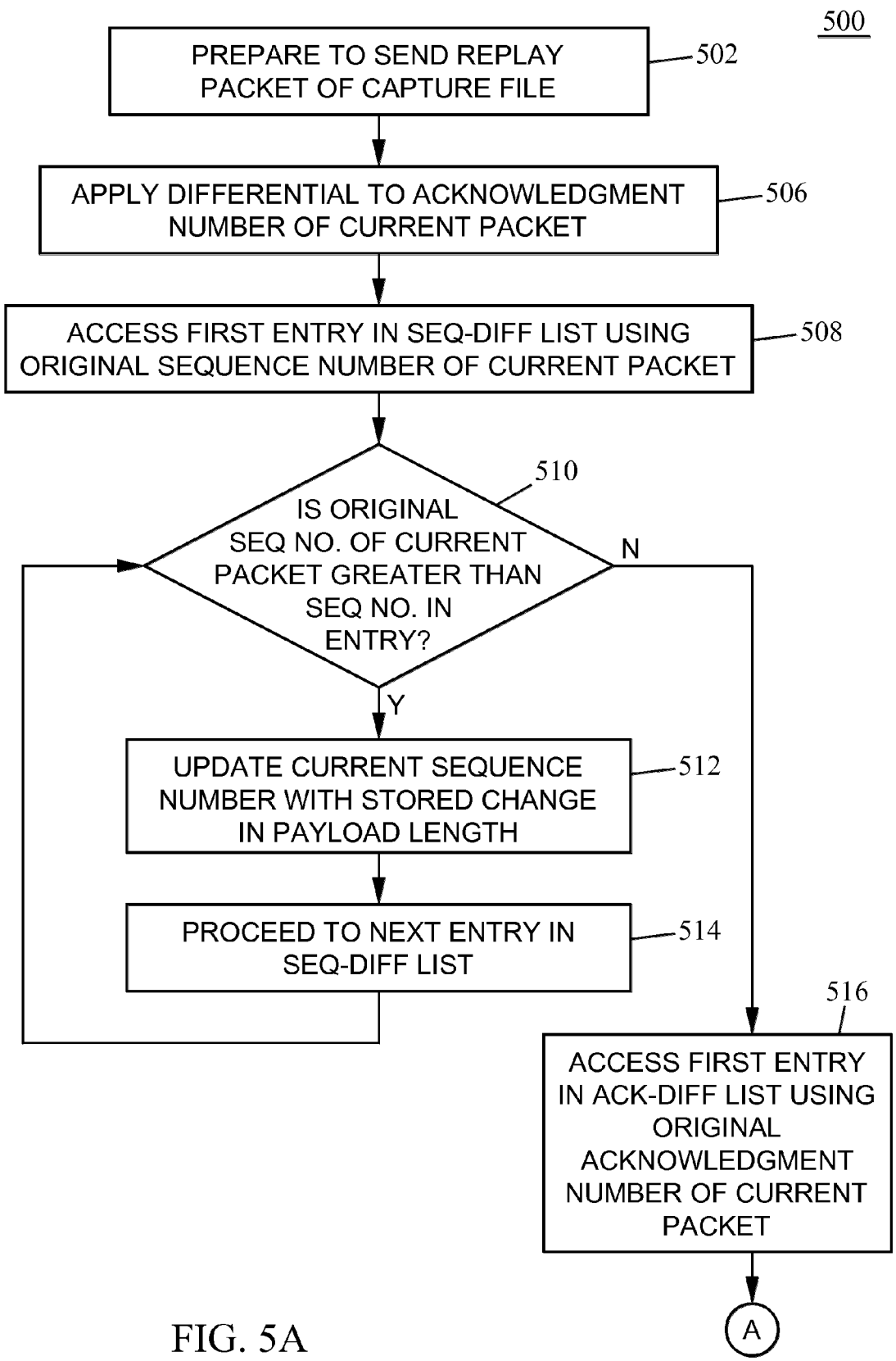
FIG. 5 is a flow chart illustrating an exemplary process for updating sequence and acknowledgment numbers upon sending a replay packet according to an embodiment of the subject matter described herein.
Figure 5B:
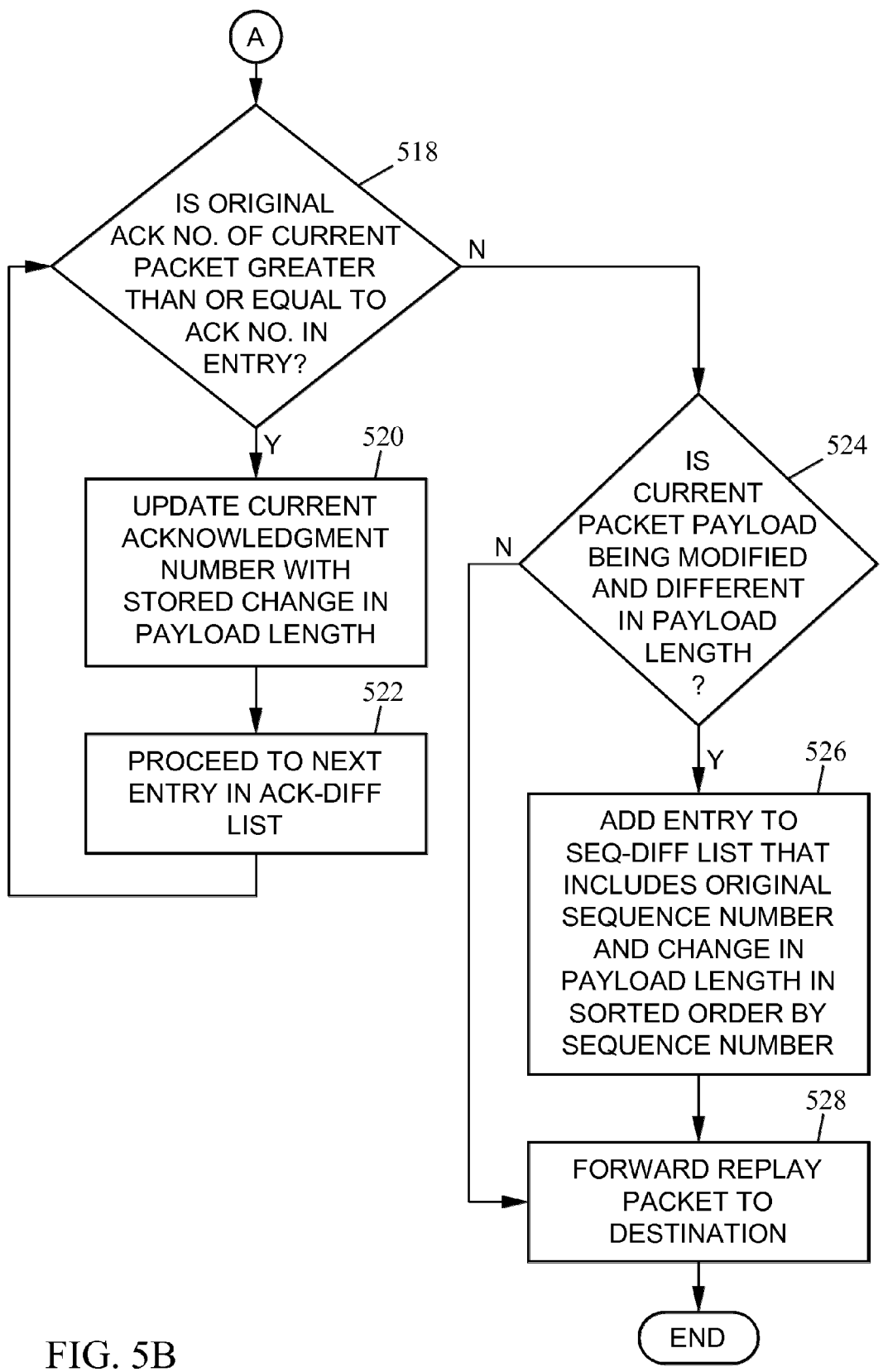

FIG. 5 illustrates an exemplary method 500 for updating sequence and acknowledgment numbers upon sending a replay packet of a capture file according to an embodiment of the subject matter described herein. In block 502, a replay packet of a capture file is prepared for transmission. In one embodiment, a sending peer node (e.g., peer node A 104) prepares to send a replay packet (i.e., the "current" packet) of a capture file. For example, upon initiating a test, the sending peer node may generate a replay packet that includes a payload associated with a capture file packet.

In block 506, a differential due to DUT sequence number randomization value is applied to the current packet acknowledgment number. In one embodiment, the sending peer node determines if a differential value exists. If a differential value does not exist, then the differential is equal to zero (0) and has no effect. If a differential value due to the DUT does exist, then the acknowledgment number is modified in accordance to the differential.

In block 508, a first entry in a sequence-differential (SEQ-DIFF) list is accessed using the original sequence number of the current packet. In one embodiment, the original sequence number of the current packet is compared to the sequence number value of the first entry in the SEQ-DIFF list.

In block 510, a determination is made as to whether the original sequence number of the current packet is greater (e.g., numerically larger) than the sequence number value in the SEQ-DIFF list entry. If the original sequence number of the current packet is greater, then method 500 continues to block 512. If the original sequence number of the current packet is less than or equal to the sequence number value in the current entry of SEQ-DIFF list entry, then method 500 continues to block 516.

In block 512, the current sequence number is updated with a stored change in payload length. In one embodiment, the differential value (i.e., indicating a change in payload length) associated with the entry in the SEQ-DIFF list is applied to the current sequence number of the current packet.

In block 514, the SEQ-DIFF list is traversed to the next entry and loops back to block 510 where a determination is made as to whether the original sequence number of the current packet is greater (e.g., numerically larger) than the sequence number value contained in the subsequent entry of SEQ-DIFF list. If the original sequence number of the current packet is greater, then method 500 cycles to block 512. If the original sequence number of the current packet is less than or equal to the sequence number value in the current entry of the SEQ-DIFF list, then method 500 continues to block 516.

In block 516, a first entry in an acknowledgment-differential (ACK-DIFF) list using the original acknowledgment number of the current packet. In one embodiment, the original acknowledgment number of the current packet is compared to the sequence number value of the first entry in the ACK-DIFF list.

In block 518, a determination is made as to whether the original acknowledgment number of the current packet is greater (e.g., numerically larger) than the acknowledgment number value in the ACK-DIFF list entry. If the original acknowledgment number of the current packet is greater, then method 500 continues to block 520. If the original acknowledgment number of the current packet is less than or equal to the acknowledgment number value in the ACK-DIFF list entry, then method 500 continues to block 524.

In block 520, the current acknowledgment number is updated with a stored change in payload length. In one embodiment, the differential value (i.e., indicating a change in payload length) associated with the entry in the ACK-DIFF list is applied to the current acknowledgment number of the current packet.

In block 522, the ACK-DIFF list is traversed to the next entry and loops back to block 518 where a determination is made as to whether the original acknowledgment number of the current packet is greater (e.g., numerically larger) than the acknowledgment number value contained in the acknowledgment entry of ACK-DIFF list. If the original acknowledgment number of the current packet is greater, then method 500 cycles to block 520. If the original acknowledgment number of the current packet is less than or equal to the acknowledgment number value in the ACK-DIFF list entry, then method 500 continues to block 524.

In block 524, a determination is made as to whether the payload of the current packet is being modified. In one embodiment, the sending peer node may modify the payload of a capture file packet such that the payload length is changed. For example, the sending peer node may change the host IP address to reflect that the capture packet is now being sent by the sending peer node (as opposed to the original host of the original packet). Specifically, a determination may be made as to whether the payload length has changed in response to modifying the payload data.

If the payload length has been modified, then method 500 continues to block 526 where an entry to the SEQ-DIFF list is added. Otherwise, method 500 continues to block 528. Specifically, the added entry may include the original sequence number and a change in payload length (i.e., a differential value). Notably, the new entry to the SEQ-DIFF list is added in accordance with a sorted sequence number order (e.g., in ascending value). The method 500 then continues to block 528 where the replay packet is forwarded to a destination.

Figure 6A:
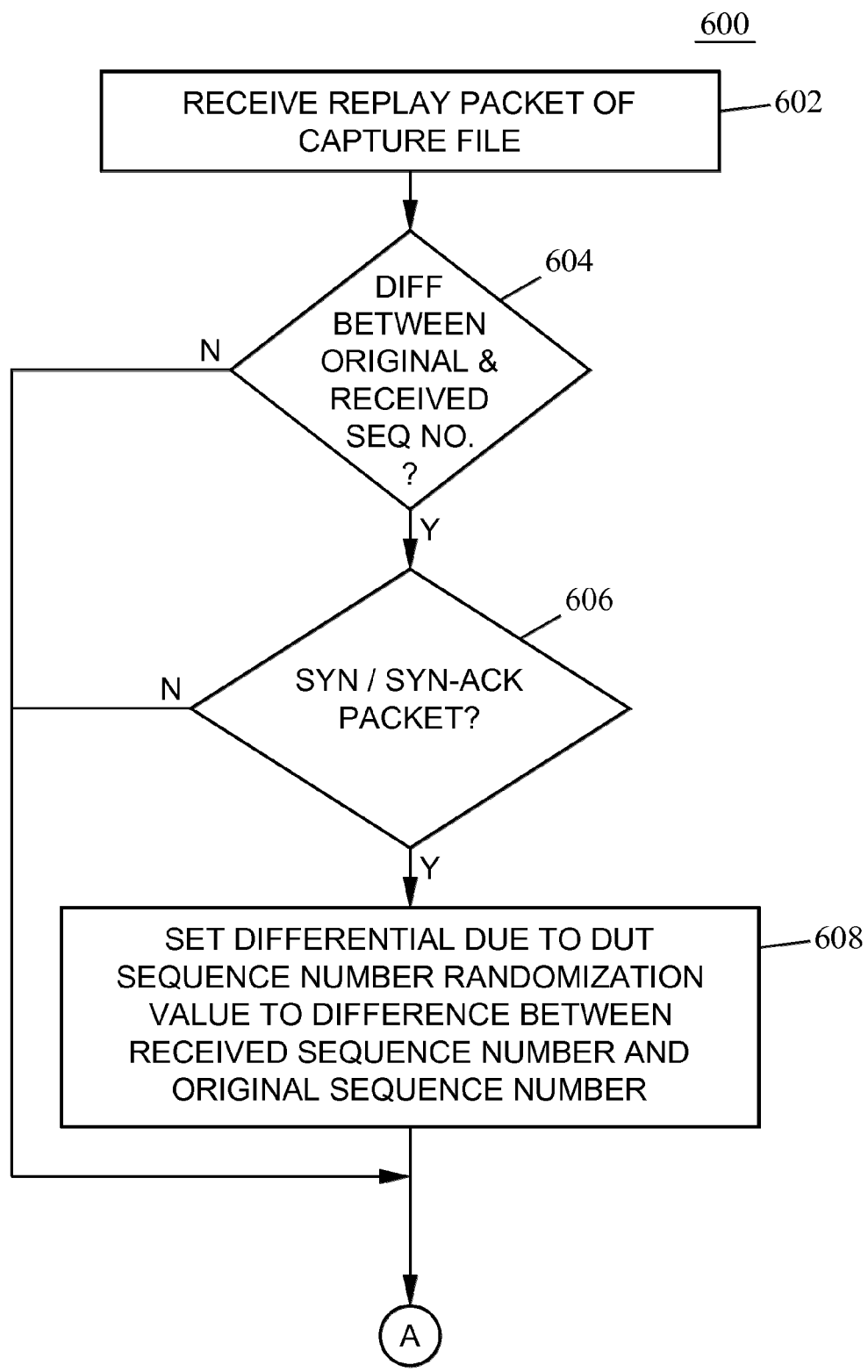
FIG. 6 is a flow chart illustrating an exemplary method for updating sequence and acknowledgment numbers upon receiving a replay packet according to an embodiment of the subject matter described herein.
Figure 6B:
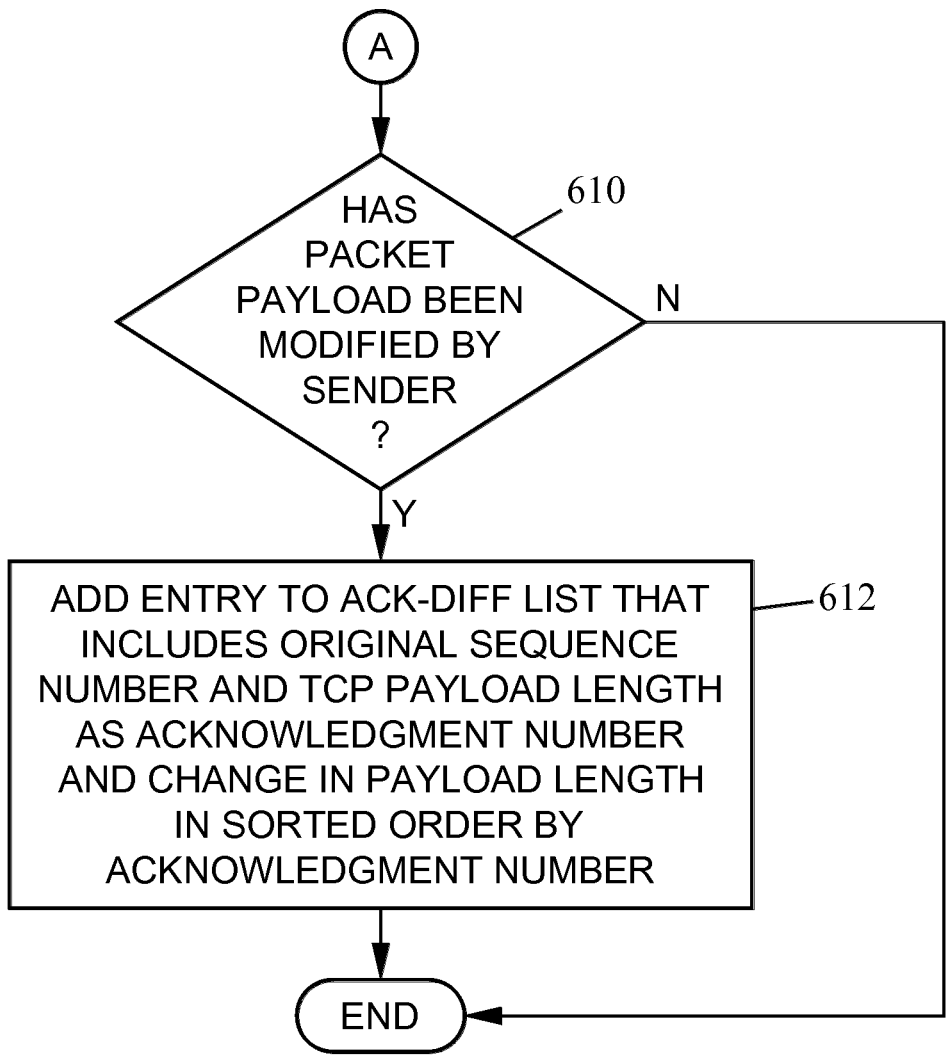

FIG. 6 illustrates an exemplary method 600 for updating sequence and acknowledgment numbers upon receiving a replay packet of a capture file according to an embodiment of the subject matter described herein. In block 602, a replay packet of a capture file is received. In one embodiment, a sending peer node (e.g., peer node A 104) sends a TCP packet to a receiving peer node (e.g., peer node B 106).

In block 604, a determination is made as to whether there is a difference between the original sequence number and the received sequence number. In one embodiment, the receiving peer node determines if the original sequence number is different than the sequence number contained in the received packet. If the two sequence number values are different, then method 600 continues to block 606. Otherwise, method 600 proceeds to block 610.

In block 606, a determination is made as to whether the received packet is a SYN/SYN-ACK packet. If condition met, then method 600 proceeds to block 608. Otherwise, method 600 proceeds to block 610.

In block 608, the differential due to DUT sequence number randomization value is set to the difference between the received sequence number and the original sequence number. In one embodiment, the receiving peer node detects that the difference between the received sequence number generated by the DUT's application and the original sequence number. The receiving peer node then utilizes the difference of the two sequence numbers to determine the differential value due to DUT sequence number randomization. The differential value due to DUT sequence number randomization may then be used to calculate/update the acknowledgment number of the packets to be sent by the receiving peer node.

In block 610, a determination is made as to whether the payload of the current packet has been modified by the sender. In one embodiment, the receiving peer node may detect that the payload length of the received packet has been modified. If the payload length has been modified, then method 600 continues to block 612 where an entry to the ACK-DIFF list is added. Otherwise, method 600 ends.

In block 612, the added entry may include the original sequence number and the original TCP payload length along with a change in payload length (i.e., a differential value). Notably, the new entry to the ACK-DIFF list is added in accordance with a sorted acknowledgment number order (e.g., in ascending value). In one embodiment, the ACK-DIFF list entry includes the original sequence number plus the original TCP payload length as an acknowledgment number of the current stream (i.e., ACK number=original SEQ number+original TCP payload length) and the change in payload length made by the sending peer node. In one embodiment, the entry is added to the ACK-DIFF list 208 in ascending sorted order (by acknowledgment number). For example, if a sending replay packet has been modified with a differential value of "D" and has an original sequence number "S" and an original TCP payload length "L", then an entry of (S+L, D) may be added to the ACK-DIFF list.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:
1. A method comprising:
 generating, at a sending peer node, a replay packet that includes a payload associated with a capture file packet;

accessing, in the sending peer node, a sequence-differential (SEQ-DIFF) list using an original sequence number associated with the replay packet;

traversing entries in the SEQ-DIFF list, wherein each of the entries includes a sequence number and a payload length differential value;

applying, for each traversed entry in the SEQ-DIFF list, the payload length differential value to the original sequence number to determine an updated sequence number for the replay packet;

transmitting, from the sending peer node to a receiving peer node, the replay packet that includes the updated sequence number; and in the event the payload of the replay packet is modified to include a payload length that differs from a payload length of the capture file packet, adding an entry to the SEQ-DIFF list, wherein the added entry includes the original sequence number and a payload length differential value, wherein the payload length differential number represents a size difference between a payload length of the replay packet and the payload length of the capture file packet.

2. The method of claim 1 comprising:
receiving, at the receiving peer node, the replay packet via a device under test (DUT);
determining that the DUT applied a differential due to DUT sequence randomization value to the replay packet; and
applying the differential due to DUT sequence number randomization value to an acknowledgement number of the replay packet, wherein the differential due to DUT sequence number randomization value is a value that accounts for a DUT sequence number randomization feature supported by the DUT.

3. The method of claim 1 wherein the replay packet includes a transmission control protocol (TCP) packet.

4. The method of claim 1 wherein the replay packet is provided to the receiving peer node via an Internet protocol (IP) socket.

5. A method comprising:
generating, at a sending peer node, a replay packet that includes a payload associated with a capture file packet;
accessing, in the sending peer node, a sequence-differential (SEQ-DIFF) list using an original sequence number associated with the replay packet;
traversing entries in the SEQ-DIFF list, wherein each of the entries includes a sequence number and a payload length differential value;
applying, for each traversed entry in the SEQ-DIFF list, the payload length differential value to the original sequence number to determine an updated sequence number for the replay packet;
transmitting, from the sending peer node to a receiving peer node, the replay packet that includes the updated sequence number;
receiving, at the receiving peer node, the replay packet;
accessing an acknowledgment-differential (ACK-DIFF) list using the original sequence number associated with the replay packet;
traversing entries in the ACK-DIFF list, wherein each of the entries includes an acknowledgment number and a payload length differential value; and
applying, for each traversed entry in the ACK-DIFF list, the payload length differential value to the original sequence number to calculate an updated acknowledgment number for the replay packet.

6. The method of claim 5 wherein the original sequence number is included in capture file information previously provisioned on the receiving peer node.

7. The method of claim 6 wherein the capture file information includes at least one of: payload content data, payload length data, and replay directional data.

8. The method of claim 5 comprising adding an entry to the ACK-DIFF list that includes i) an acknowledgment number value comprising the sum of the original sequence number and the original payload length of the replay packet ii) the payload length differential value.

9. A system comprising:
a sending peer node configured to generate a replay packet that includes a payload associated with a capture file packet, to access a sequence-differential (SEQ-DIFF) list using an original sequence number associated with the replay packet, to traverse entries in the SEQ-DIFF list, wherein each of the entries includes a sequence number and a payload length differential value, to apply, for each traversed entry in the SEQ-DIFF list, the payload length differential value to the original sequence number to determine an updated sequence number for the replay packet, to transmit the replay packet that includes the updated sequence number; and in the event the payload of the replay packet is modified to include a payload length that differs from a payload length of the capture file packet, to add an entry to the SEQ-DIFF list, wherein the added entry includes the original sequence number and a payload length differential value, wherein the payload length differential value represents a size difference between a payload length of the replay packet and the payload length of the capture file packet; and
a receiving peer node configured to receive the replay packet.

10. The system of claim 9 wherein the receiving peer node is configured to receive the replay packet via a device under test (DUT), to determine that the DUT applied a differential due to DUT sequence randomization value to the replay packet, and to apply the differential due to DUT sequence number randomization value to the an acknowledgement number of the replay packet, wherein the differential due to DUT sequence number randomization value is a value that accounts for a DUT sequence number randomization feature supported by the DUT.

11. The system of claim 9 wherein the replay packet includes a transmission control protocol (TCP) packet.

12. The system of claim 9 wherein the replay packet is provided to the receiving peer node via an Internet protocol (IP) socket.

13. A system comprising:
a sending peer node configured to generate a replay packet that includes a payload associated with a capture file packet, to access a sequence-differential (SEQ-DIFF) list using an original sequence number associated with the replay packet, to traverse entries in the SEQ-DIFF list, wherein each of the entries includes a sequence number and a payload length differential value, to apply, for each traversed entry in the SEQ-DIFF list, the payload length differential value to the original sequence number to determine an updated sequence number for the replay packet, and to transmit the replay packet that includes the updated sequence number; and
a receiving peer node configured to receive the replay packet, to access an acknowledgment-differential (ACK-DIFF) list using the original sequence number associated with the replay packet, to traverse entries in the ACK-DIFF list, wherein each of the entries includes an acknowledgment number and a payload length differential value, and to apply, for each traversed entry in the ACK-DIFF list, the payload length differential value to the original sequence number to calculate an updated acknowledgment number for the replay packet.

14. The system of claim 13 wherein the original sequence number is included in capture file information previously provisioned on the receiving peer node.

15. The system of claim 14 wherein the capture file information includes at least one of: payload content data, payload length data, and replay directional data.

16. The system of claim 13 wherein the receiving node is further configured to add an entry to the ACK-DIFF list that includes i) an acknowledgment number value comprising the sum of the original sequence number and the original payload length of the replay packet ii) the payload length differential value.

17. A non-transitory computer readable medium comprising computer executable instructions embodied in a computer readable medium that when executed by a processor of a computer control the computer to perform steps comprising:
generating, at a sending peer node, a replay packet that includes a payload associated with a capture file packet;
accessing, in the sending peer node, a sequence-differential (SEQ-DIFF) list using an original sequence number associated with the replay packet;
traversing entries in the SEQ-DIFF list, wherein each of the entries includes a sequence number and a payload length differential value;
applying, for each traversed entry in the SEQ-DIFF list, the payload length differential value to the original sequence number to determine an updated sequence number for the replay packet;
transmitting, from the sending peer node to a receiving peer node, the replay packet that includes the updated sequence number; and
in the event the payload of the replay packet is modified to include a payload length that differs from a payload length of the capture file packet, adding an entry to the SEQ-DIFF list, wherein the added entry includes the original sequence number and a payload length differential value, wherein the payload length differential number represents a size difference between a payload length of the replay packet and the payload length of the capture file packet.

18. The computer readable medium of claim 17 comprising:
receiving, by the receiving peer node, the replay packet via a device under test (DUT);
determining that the DUT applied a differential due to DUT sequence randomization value to the replay packet; and
applying the differential due to DUT sequence number randomization value to an acknowledgement number of the replay packet, wherein the differential due to DUT sequence number randomization value is a value that accounts for a DUT sequence number randomization feature supported by the DUT.

19. The computer readable medium of claim 17 wherein the replay packet includes a transmission control protocol (TCP) packet.

20. The computer readable medium of claim 17 wherein the replay packet is provided to the receiving peer node via an Internet protocol (IP) socket.

21. A non-transitory computer readable medium comprising computer executable instructions embodied in a computer readable medium that when executed by a processor of a computer control the computer to perform steps comprising:
generating, at a sending peer node, a replay packet that includes a payload associated with a capture file packet;
accessing, in the sending peer node, a sequence-differential (SEQ-DIFF) list using an original sequence number associated with the replay packet;
traversing entries in the SEQ-DIFF list, wherein each of the entries includes a sequence number and a payload length differential value;
applying, for each traversed entry in the SEQ-DIFF list, the payload length differential value to the original sequence number to determine an updated sequence number for the replay packet;
transmitting, from the sending peer node to a receiving peer node, the replay packet that includes the updated sequence number;
receiving, at the receiving peer node, the replay packet;
accessing an acknowledgment-differential (ACK-DIFF) list using the original sequence number associated with the replay packet;
traversing entries in the ACK-DIFF list, wherein each of the entries includes an acknowledgment number and a payload length differential value; and
applying, for each traversed entry in the ACK-DIFF list, the payload length differential value to the original sequence number to calculate an updated acknowledgment number for the replay packet.

22. The computer readable medium of claim 21 wherein the original sequence number is included in capture file information previously provisioned on the receiving peer node.

23. The computer readable medium of claim 22 wherein the capture file information includes at least one of: payload content data, payload length data, and replay directional data.

24. The computer readable medium of claim 22 comprising adding an entry to the ACK-DIFF list that includes i) an acknowledgment number value comprising the sum of the original sequence number and the original payload length of the replay packet ii) the payload length differential value.

\* \* \* \* \*